United States Patent [19]
Iijima

[11] Patent Number: 6,106,598
[45] Date of Patent: Aug. 22, 2000

[54] INK SET FOR INK-JET IMAGE FORMATION

[75] Inventor: Hirotaka Iijima, Hino, Japan

[73] Assignee: Konica Corporation, Tokyo, Japan

[21] Appl. No.: 09/248,480

[22] Filed: Feb. 11, 1999

[30] Foreign Application Priority Data

Feb. 19, 1998 [JP] Japan .................................. 10-050045

[51] Int. Cl.$^7$ .................................................. C09D 11/02
[52] U.S. Cl. ........................................ 106/31.27; 106/31.6
[58] Field of Search ................................ 106/31.27, 31.6

[56] References Cited

U.S. PATENT DOCUMENTS

| | | | |
|---|---|---|---|
| 5,476,540 | 12/1995 | Shileds et al. | 106/31.7 |
| 5,624,484 | 4/1997 | Takahashi et al. | 106/31.75 |
| 5,846,306 | 12/1998 | Kubota et al. | 106/31.6 |
| 5,864,350 | 1/1999 | Shioya et al. | 347/6 |
| 5,866,638 | 2/1999 | Shimomura et al. | 106/31.46 |
| 5,953,026 | 9/1999 | Yoshino | 347/36 |
| 6,030,441 | 2/2000 | Kubota et al. | 106/31.75 |

FOREIGN PATENT DOCUMENTS

| | | |
|---|---|---|
| 534634 | 3/1993 | European Pat. Off. . |
| 0 781 665 | 7/1997 | European Pat. Off. . |
| 0 791 473 | 8/1997 | European Pat. Off. . |
| 299971 | 12/1988 | Japan . |

*Primary Examiner*—Helene Klemanski
*Attorney, Agent, or Firm*—Frishauf, Holtz, Goodman, Langer & Chick, P.C.

[57] ABSTRACT

An ink set for jet-printing is disclosed. The ink set comprises an ink liquid containing a colorant and a substantially colorless liquid composition containing an anionic metal oxide colloid, which are to be mixed with the ink liquid after jetted, wherein a viscosity A cp of the ink liquid, a viscosity B cp of the liquid composition and a viscosity C cp of a mixture of equal amount of the ink liquid and the liquid composition satisfy the following relations;

$|A-B| \leq 5$, $1<A<10$, $1<B<10$, and $C/A>5$.

5 Claims, No Drawings

INK SET FOR INK-JET IMAGE FORMATION

FIELD OF THE INVENTION

This invention relates to an ink set for forming an image of character or drawing by an ink-jet recording method, particularly relates to an ink set for image formation and an image forming method excellent in the image printing property.

BACKGROUND OF THE INVENTION

The ink-jet recording method is a recording method in which a droplet of ink liquid composed of a solvent such as water and a colorant dissolved or dispersed in the solvent is jetted and adhered on a recording element. The ink-jet recording has an advantage that the recording can be performed silently and that various kinds of recording element can be used since the recording element is not contacted with any device.

However, when plain paper such as copy paper or reporting paper other than paper for ink-jet recording is used as the recording element, such problems tend to occur that the shape of dot is become uneven, so-called feathering, and that the colors different each other are mixed near the boundary thereof, so-called bleeding. As a result, problems are raised such as considerable degradation in the quality of the character or picture, lowering in the image density and easy wash away of the image by water. It is the present condition, therefore, that the paper exclusive for use of ink-jet recording is reqired.

A method for solving the above-mentioned problems has been proposed in Japanese Patent Publication Open for Public Inspection (JP O.P.I.) No. 4-372670, in which an ink containing a water-soluble dye and a pyrrolydone compound are used and the difference of pH value of the ink and that of the recording element is made 2 or more. This method has a problem that the recording element must be selected so as to fit with the ink. Use of an ink containing a specified polyol has been proposed in JP O.P.I. Nos. 6-172692, 4-211474, 4-211475 and 4-211476. When such the ink is used, the water resistivity of image cannot be apparently improved, even though the feathering and bleeding on palain paper are improved. Moreover, JP O.P.I. No. 4-332777 proposes an ink containing a polyalkyleneamine. Such the ink has a problem that the stability of ink is degraded even though the water resistivity is improved. JP O.P.I. No. 63-299970 proposes an ink-jet recording method in which an ink containing a dye having an acidic group is adhered to a recording element after a colorless or slightly colored liquid containing a poly-valent metal salt is adhered. Although the water resistivity can be raised by this ink-jet recording method, the improving effect on the bleeding at the boundary between different colors is insufficient since the image is formed by precipitation of the dye itself, and unevenness of density of image tends to be caused by uneven precipitation of the dye.

It has been found by investigation by the inventors that, in an ink-jet recording method using an ink containing a colorant and a liquid composition containing an anionic metal oxide colloid, the feathering and bleeding are considerably improved and the water resistivity of image is also considerably improved by adjusting the viscosity of the ink, the liquid composition and a mixture thereof at a specified value even when plain paper is used.

SUMMARY OF THE INVENTION

The object of the invention is to provide an ink set for forming an image by an ink-jet printing method by which a high quality image having an excellent water resistivity and a high density can be formed.

The above-mentioned objects can be achieved by an ink set for jet-printing comprising an ink liquid containing a colorant and a substantially colorless liquid composition containing an anionic metal oxide colloid, which are to be mixed with the ink liquid after jetted, wherein a viscosity A cp of the ink liquid, a viscosity B cp of the liquid composition and a viscosity C cp of a mixture of equal amount of the ink liquid and the liquid composition satisfy the following relations;

$|A-B| \leq 5$, $1<A<10$, $1<B<10$, and $C/A>5$.

DETAILED DESCRIPTION OF THE INVENTION

In the invention, an ink liquid and a liquid composition each having a viscosity suitable for ink-jet printing are mixed after jetted and the viscosity of the mixture is raised to a value suitable for preventing the feathering and bleeding of the ink jetted on the paper. It is supposed that the increasing of the viscosity of the mixture is mainly caused by increasing in an interaction between the metal oxide particles by instabilization of the meatl oxide colloid. The stability of the metal oxide colloid is lowered by destroying the balance of an electric charge double layer of the colloidal particles by mixing with the ink liquid. The electric chage balance of the elecrtic charge double layer of the metal oxide colloid can be destroyed by various means such as a variation of pH, an addition of a salt, electrolyte, an organic solvent or a surfactant. In the invention, the liquid composition containing an anionic metal oxide colloid and the ink liquid containing a colorant and a substance capable of destroying the stability of the metal oxide colloid are mixed by jetting thereof and the viscosity of the mixture is inclrased. The feathering and bleeding image is cosiderably inhibited by the increasing of voscosity of the mixture of the ink liquid qnd the liquid composition jetted on the paper.

The substantially colorless liquid composition of the invention containing anionic metal oxide colloid, hereinafter simply referred to a liquid composition, is described in detail below.

The anionic metal oxide colloid is a colloid of metal oxide which has an anionic property. As the anionic metal oxide colloid, for example, a silica sol, a titania sol and a vanadium oxide sol are usable. The silica sol is particularly preferable in the invention.

The average diameter of the anionic metal oxide colloid is preferably not more than 500 nm, more preferably not more than 100 nm, particularly preferably not more than 50 nm.

In the liquid composition of the invention, it is preferred that the anionic metal oxide colloid is contained in an amount of solid component of from 0.5 to 50% by weight more preferably 1% to 30%.

An anionic metal oxide colloid prepared in a state dispersed in a dispersing medium is preferably used for preparing the liquid composition of the invention, even though a solid anionic metal oxide is usable. Although water is commonly used as the dispersion medium, an organic solvent such as methanol, ethanol, isopropyl alcohol, ethylene glycol and dimethyl-acetoamide may be used other than water.

In the liquid composition of the invention, one kind of anionic metal oxide colloid may be singly used or two or more kinds of anionic metal oxide may be used in combination. The liquid composition may be only composed of the anionic metal oxide colloid, and water or a water-miscible organic solvent may be further added.

Examples of the water-miscible organic solvent usable include an alkylene glycol such as ethylene glycol, diethylene glycol, triethylene glycol, propylene glycol, hexanetriol and thiodiglycol, a lower alkyl ether of polyol such as ethylene glycol methyl ether, diethylene glycol monoethyl ether and triethylene glycol monobutyl ether, a mono-valent alcohol such as ethanol, methanol and isopropyl alcohol, a polyethylene glycol such as polyethylene glycol and polypropylene glycol, an amide such as dimetylformamide and dimethylacetoamide, a ketone such as acetone, an ether such as tetrahydrofuran and dioxane, triethanolamine, N-methyl-2-pyrrolydone, glycerol, 1,3 dimethylimidazolydinone, sulforan and dimethyl sulfoxide.

A surfactant may be added to the liquid composition of the invention according to necessity.

As the surfactant, for example, an anionic surfactant such as a dialkyl sulfosuccinate, an alkyl naphthalenesulfonate and a fatty acid salt, a nonionic surfactant such as a polyoxyethylene alkyl ether, a polyoxyethylene alkyl aryl ether, an acetylene glycol and a polyoxyethylene.polyoxypropylene block copolymer, and a cationic surfactant such as an alkylamine salt and a quaternary ammonium salt are usable. Among these surfactants, anionic and nonionic surfactants are preferable.

Moreover, various additives such as a viscosity controlling agent, a pH controlling agent, a preservant and an antioxidant may be added to the liquid composition of the invention according to necessity.

In the invention, the viscosity of the ink liquid and the liquid composition are each measured by the following procedure:

The temperature of liquid to be measured is kept at 25° C. and the viscosity of the sample is measured by a vibration viscometer such as Viscomate VM-1A-L8 manufactured by Yamaichi Denki Co., Ltd. A sample of mixture for measuring the viscosity of the mixture of the ink liquid and the liquid composition was prepared by mixing them a ratio of 1:1 whch are each previously adjusted at 25° C. Thus obtained mixture is kept at 25° C. and the viscosity thereof is measured in the same manner as in the above-mentioned.

In the invention, the ink set is a combination of an ink liquid and a liquid composition to be mixed with the ink liquid after jetted. The viscosity of the ink liquid and the liquid composition are each more than 1 cP and less than 10 cP, preferably not less than 2 cP and not more than 8 cP.

The liquid composition of the invention is substantially colorless. "Colorless" means that an image formed by the liquid composition is hardly recognized as an image by visible observation.

Next, the ink liquid of the invention containing a colorant, hereinafter referred to an ink liquid, is described below.

As the colorant, a dye and a pigment such as a direct dye, an acidic dye, a reactive dye and a basic dye. These colorants may be used singly or in combination of two or more kinds thereof. The basic dye is preferably used.

In the ink liquid, a solvent is used with the colorant. Water or a water-miscible organic solvent is preferably used as the solvent even though any solvent can be used. Examples of usable solvent include a glycol such as ethylene glycol, diethylene glycol, triethylene glycol, propylene glycol, hexanetriol and thiodiglycol, a lower alkyl ether of polyol such as ethylene glycol methyl ether, diethylene glycol monoethyl ether and triethylene glycol monobutyl ether, a mono-valent alcohol such as ethanol, methanol and isopropyl alcohol, a polyalkylene glycol such as polyethylene glycol and polypropylene glycol, an amide such as dimethylformamide and dimethylacetoamide, a ketone such as acetone, an ether such as tetrahydrofuran and dioxane, triethanolamine, N-methyl-2-pyrrolydine, glycerol, 1,3-dimethylimidazolidinone, sulforan and dimethylsulfoxide.

The water-miscible solvent is preferably used in an amount of from 5 to 60% of the whole weight of the ink liquid, from 10 to 40% by weight is more preferable.

The ink liquid may contain various substances such as a poly-valent metal ion, a pH controlling agent, and a cationic substance to control the viscosity of the mixture of the liquid composition withthe ink liquid.

The ink liquid of the invention can contain a poly-valent metal ion and/or a poly-valent metal salt. Examples of usable poly-valent metal ion are an aluminum ion, a calcium ion, a magnesium ion, a boron ion, a strontium ion, and a barium ion. Examples of usable poly-valent metal salt are calcium chloride, magnesium sulfate, sodium borate and barium sulfate.

A pH controlling agent can be contained in the ink liquid of the invention. For example, a salt, an inorganic or organic acid, an inorganic or organic base can be used as the pH controlling agent. A pH buffer such as Menzel's buffering solution, McIlvaine's buffering solution and Michaels' buffering solution are also usable.

A cationic substance may be contained in the ink liquid of the invention. Examples of the cationic substance include a primary, secondary and tertiary amine compound, a quatenary ammonium salt compound, a pyridinium salt and an adduct of alkylamine with ethyleneoxide.

The ink liquid of the invention may further contain a surfactant, a viscosity controlling agent, a preservant, an antioxidant and a dispersant according to necessity.

When an image is recorded on a recording element by using the ink liquid and the liquid composition of the invention, a method such as a method for coating or immersing by means of an applicator, a wire bar or dipping, a spray atomizing method and an ink-jet method, can be applied to adhere the liquid composition of the invention to the recording element. The ink-jet method is preferably used since the position and the amount of the liquid composition to be adhered to the recording element is easily controlled and the effects of the invention can be enhanced.

The position at which the ink liquid and the liquid composition are mixed is not specifically limited as long as the mixing is performed after that the ink liquid and the liquid composition is jetted from the ink-jetting head. The mixing may be performed in the course of flying of the droplets thereof, or on the surface of the recording element. The method for mixing them on the surface of the recording element is preferable since the adhering position of the droplets can easily controlled and the effects of the invention can be enhanced.

There is no specific limitation on the order of adhesion of the ink liquid and the liquid composition. The ink liquid and the liquid composition may be adhered in the same time, or the liquid composition may be adhered either before or after adhesion of the ink liquid. When the ink-jet method is applied for image recording, it is preferred that the liquid composition is adhered before or after adhesion of the ink liquid because the recording can be performed by means of at least one nozzle for jetting the liquid composition.

With respect to the order of adhesion of the ink liquid and the liquid composition, the order that the liquid composition is adhered before adhesion of the ink liquid is preferred compared to that the ink liquid is adhered before the adhesion of the liquid composition since a high density of image can be obtained in the former case.

Both of an on-demand system and a continuous system may be used in the ink-jet recording method, and the on-demand system is preferable.

Although at least one ink liquid is used for forming an image, two or more ink liquids may be used. When two or more ink liquids are used, at least one kind of the ink liquid is one contained in the ink kit according to the invention, and it is particularly preferable that all ink liquids to be used are ink liquids of the ink set according to the invention.

In the ink-jet recording according to the invention, PPC paper so called plain paper is usable. Moreover, paper exclusively used for ink-jet recording, glossy paper exclusively used for ink jet recording, glossy paper, coated paper and a transparency film may also be used.

EXAMPLES

Example 1
<Preparation of Liquid compositions 1 to 5>

Liquid compositions 1 to 4 were prepared according to the following receipts. Liquid compositions 1 to 5 were each prepared by stirring and filtered with a pressure through a 0.8 μm membrane filter.

| Liquid composition 1 | |
|---|---|
| Colloidal silica, Snowtex-20 (Nissan Kagaku Co., Ltd.) | 40 parts |
| Glycerol | 15 parts |
| Diethylene glycol monomethyl ether | 10 parts |
| Surfactant, Newpole PE-62 (Sanyo Kasei Kogyo Co., Ltd.) | 0.15 parts |
| Ion exchanged water | 20 Parts |
| Liquid composition 2 | |
| Colloidal silica, Cataloid S-20L (Syokubai Kasei Kogyo Co., Ltd.) | 70 parts |
| Ethylene glycol | 20 parts |
| Diethylene glycol | 10 parts |
| Isopropyl alcohol | 3 parts |
| Surfactant Surfynol SE (Nissin Kagaku Co., Ltd.) | 0.1 parts |
| Ion exchanged water | 5 parts |
| Liquid composition 3 | |
| Colloidal silica, Snowtex-20 | 40 parts |
| 2-methy-2,4-pentanediol | 40 parts |
| Surfactant Emulgen 911 (Kao Co.; Ltd.) | 0.1 parts |
| Ion exchanged water | 10 parts |
| Liquid composition 4 | |
| Diethylene glycol | 18 parts |
| Triethylene glycol monobutyl ether | 9 parts |
| Surfactant, Surfynol 465 (Nissin Kagaku Co., Ltd.) | 0.1 parts |
| Ion exchanged water | 63 parts |
| Liquid composition 5 | |
| Colloidal silica, Cataloid S-20 | 50 parts |
| Diethylene glycol | 20 parts |
| Glycerol | 25 parts |
| Surfactant, Emulgen 913 (Kao Co., Ltd.) | 0.2 parts |
| Ion exchanged water | 5 parts |

<Preparation of Ink liquids 1-K to 3-K>

Ink liquidss 1-K through 3-K were prepared according to the following receipts. The ink liquidss were each stirred and the pH thereof is adjusted to a designated value. Then the ink liquidss were each filtered with a pressure through a 0.45 μm membrane filter.

| Ink liquid 1-K | |
|---|---|
| Special Black SP (Bayer Co., Ltd.) | 18 parts |
| Diethylene glycol | 23 parts |
| Triethylene glycol monobutyl ether | 11 parts |
| Emulgen 910 (Kao Co., Ltd.) | 0.1 parts |
| Ion exchanged water | 60 parts |
| pH = 10 | |
| Ink liquid 2-K | |
| C.I. Food Black 2 | 4 parts |
| Ethylene glycol | 30 parts |
| Polyethylene glycol (Molecular weight: 600) | 5 parts |
| Surfynol 465 (Sanyo Kasei Co., Ltd.) | 0.1 parts |
| Calcium chloride | 0.5 parts |
| Ion exchanged water | 60 parts |
| pH = 10 | |
| Ink liquid 3-K | |
| C.I. Basic Black 8 | 5 parts |
| Diethylene glycol | 15 parts |
| Glycerol | 10 parts |
| Tetraethylene glycol | 3 parts |
| Surfactant, Emulgen 911 (Kao Co., Ltd.) | 0.1 parts |
| Ion exchanged water | 67 parts |
| pH = 8 | |
| Ink liquid 4-K | |
| C.I. Food Black 2 | 4 parts |
| Diethylene glycol | 30 parts |
| Triethylene glycol monobutyl ether | 15 parts |
| Glycerol | 10 parts |
| Surfactant, Emulgen 913 | 0.3 parts |
| Ion exchanged water | 40 parts |
| pH = 8 | |

Measurement of viscosity
Viscosity of the liquid composition and ink liquid

The temperature of the liquid composition or the ink liquid was adjusted to 25° C. and the viscosity thereof was measured by a vibration viscometer Viscomate VM-1A-L manufactured by Yamaichi Denki Co., Ltd.

Viscosity of a mixture of the liquid composition and the ink liquid

The liquid composition and the ink liquid each previously adjusted at 25° C. were mixed in a ratio of 1:1, the temperature of the mixture was adjusted to 25° C. and the viscosity thereof is measured by the vibration viscosity meter Viscomate VM-1A-L manufactured by Yamaichi Denki Co., Ltd.

<Ink-jet recording>

A piezo type ink-jet head jetting droplets each having a volume of 15 picoliter was used. An image was recorded by means of the liquid composition and the ink liquid described in Table 1, the order and the interval of jetting of the ink liquid and liquid composition for recording were as shown in Table 1. The density of record was 600 dpi. Plain paper, Konica PPC Paper NR-AW, manufactured by Konica Corp., was used as the recording element.

The liquid compositions and ink liquids used in the experiments were shown in Table 1 together with the viscosity of the liquid composition, ink liquid and that of the mixture of the liquid composition and the ink liquid at the time of mixing, the ratio C/A of the viscosity C of the mixture of the liquid composition and the ink liquid to the viscosity A of the ink.

Evaluation of recorded image
1. Quality of character

A black character was recorded and the degree of feathering was visually observed, and evaluated according to the following evaluation standard.

Evaluation standard
- A: Feathering is practically not observed.
- B: Feathering is slightly observed but causes no problem in practical use.
- C: Feathering is observed, which causes a problem in practical use.

2. Image density

The density of a solid black portion of the image was measured by a reflective densitometer X-Rite 938, manufactured by Nihon Heiban Kizai Co., Ltd., and evaluated according to the following evaluation standard.

Evaluation standard
- A: The reflective density is not less than 1.3.
- B: The reflective density is not less than 1.2 and less than 1.3.
- C: The reflective density is less than 1.2.

3. Water resistivity

A black character was recorded and the recorded sample was stood for 1 hour in an atmosphere at 23° C. and 50% RH, the sample was immersed in water of 25° C. for 1 minute. The sample was naturally dried after take out from the water and visually observed, and evaluated according to the following evaluation standard.

Evaluation standard
- A: Blurring and lowering in the density are practically not observed.
- B: Blurring and lowering in the density are slightly observed but which cause no problem in practical use.
- C: Blurring and lowering in the density are observed, which cause a problem in practical use.

Thus obtained results are listed in Table 1.

| Ink liquid 1-Y: C.I. Direct Yellow 86 | 2 parts |
| Ink liquid 1-M: C.I. Direct Red 227 | 3 parts |
| Ink liquid 1-C: C.I. Direct Blue 199 | 2 parts |

Ink liquids 2-Y, 2-M and 2-C were prepared in the same manner as in Ink liquid 2-K except that C.I. Food Black 2 was replaced by the followings.

| Ink liquid 2-Y: C.I Acid Yellow 23 | 2 parts |
| Ink liquid 2-M: C.I. Reactive Red 23 | 2 parts |
| Ink liquid 2-C: C.I. Acid Blue 9 | 2 parts |

Ink liquids 3-Y, 3-M and 3-C were prepared in the same manner as in Ink liquid 3-K except that C.I. Basic Black 8 was replaced by the followings.

| Ink liquid 3-Y: C.I. Basic Yellow 2 | 2 parts |
| Ink liquid 3-M: C.I. Basic Red 2 | 2 parts |
| Ink liquid 3-C: C.I. Basic Blue 9 | 2 parts |

Measurement of viscosity

Measurement of viscosity of the ink liquid and that of a mixture of the ink liquid and the liquid composition at the time of mixing The measurement is carried out by the method described in the foregoing example.

TABLE 1

| Experiment No. | Liquid composition Kind | Viscosity (cP) | Ink Kind | Viscosity (cP) | Viscosity of mixture (cP) | C/A | Order of jetting | Interval of jetting (sec.) | Feathering | Image density | Water resistivity | Note |
| --- | --- | --- | --- | --- | --- | --- | --- | --- | --- | --- | --- | --- |
| 1-1 | 1 | 3.6 | 1-K | 3.5 | 20 | 5.71 | Liquid is previous | <0.5 | A | A | A | Inv. |
| 1-2 | 2 | 4.6 | 2-K | 3.1 | 50 | 16.13 | Liquid is previous | <0.5 | A | A | B | Inv. |
| 1-3 | 1 | 3.6 | 3-K | 2.8 | 32 | 11.43 | Liquid is previous | <0.5 | A | A | A | Inv. |
| 1-4 | 2 | 4.6 | 3-K | 2.8 | 54 | 19.29 | Liquid is previous | <0.5 | A | A | A | Inv. |
| 1-5 | 2 | 4.6 | 2-K | 3.1 | 50 | 16.13 | Ink is previous | <0.5 | B | B | A | Inv. |
| 1-6 | 1 | 3.6 | 3-K | 2.8 | 32 | 11.43 | Liquid is previous | 3 | A | B | B | Inv. |
| 1-7 | 1 | 3.6 | 3-K | 2.8 | 32 | 11.43 | Liquid is previous | 10 | B | B | B | Inv. |
| 1-8 | 5 | 7.4 | 4-K | 7.2 | 42 | 5.83 | Liquid is previous | <0.5 | B | A | B | Inv. |
| 1-9 | 3 | 12 | 2-K | 3.1 | 44 | 14.19 | Liquid is previous | <0.5 | C | A | B | Comp. |
| 1-10 | 4 | 2.5 | 2-K | 3.1 | 2.7 | 0.87 | Liquid is previous | <0.5 | C | C | C | Comp. |
| 1-11 | None | — | 1-K | 3.5 | — | — | — | <0.5 | C | C | C | Comp. |

Example 2

<Preparation of Ink liquids 1-Y, 1-M and 1-C>

Ink liquids 1-Y, 1-M and 1-C were prepared in the same manner as in Ink liquid 1-K except that Special Black SP was replaced by the followings.

<Ink jet recording>

A piezo type ink-jet head jetting droplets each having a volume of 15 pl was used. An image was recorded on a recording element by jetting the liquid composition and the ink liquid described in Table 3. When the liquid composition was used, the liquid composition was previously jetted and the interval of jetting of the liquid composition and that for the ink liquid is controlled so that the interval was not more than 1 second. The density of the record was 600 dpi and plain paper, Konica PPC paper NR-AW manufactured by Konica Corporation, was used.

The liquid compositions and ink liquids were shown in Table 2 together with the viscosity of the liquid composition, ink liquid and that of the mixture of the liquid composition and the ink liquid (viscosity at the time of mixing), the ratio C/A of the viscosity C the mixture of the liquid composition and the ink liquid to the viscosity A of the ink liquid.

Evaluation of recorded image

The quality of character and the density of image were evaluated in the same manner as in the foregoing example. Moreover, the bleeding and the water resistivity were evaluated in the following manner.

1. Bleeding

A black character was recorded on yellow background and the degree of bleeding at the boundary of colors was visually observed, and the evaluation was performed according to the following standard.

A: Bleeding is practically not observed.

B: Bleeding is slightly observed but causes no problem in practical use.

C: Bleeding is observed, which causes a problem in practical use.

2. Water resistivity

A yellow, magenta, cyan and black character were recorded and the recorded samples were stood for 1 hour in an atmosphere at 23° C. and 50% RH, the sample was immersed in water of 25° C. for 1 minute. The sample was naturally dried after take out from the water and visually observed, and evaluated according to the following evaluation standard. The evaluation was performed about a color character which is most inferior.

Evaluation standard

A: Blurring and lowering in the density are practically not observed.

B: Blurring and lowering in the density are slightly observed but no problem in practical use.

C: Blurring and lowering in the density are observed, which cause a problem in practical use.

Thus obtained results are shown in Table 2 together with the liquid composition and the ink liquid used.

TABLE 2

| Experiment No. | Liquid composition Kind | Vis. (cP) | Yellow ink Kind | Vis. (cP) | Vis. of Mixture (cP) | C/A | Magenta ink Kind | Vis. (cP) | Vis. of Mixture (cP) | C/A | Cyan ink Kind | Vis. (cP) | Vis. of Mixture (cP) | C/A | Black ink Kind | Vis. (cP) | Vis. of Mixture (cP) | C/A |
|---|---|---|---|---|---|---|---|---|---|---|---|---|---|---|---|---|---|---|
| 2-1 | 1 | 3.6 | 1-Y | 3.4 | 18 | 5.3 | 1-M | 3.5 | 19 | 5.4 | 1-C | 3.5 | 19 | 5.4 | 1-K | 3.5 | 20 | 5.7 |
| 2-2 | 2 | 4.6 | 2-Y | 3.2 | 53 | 16.6 | 2-M | 3.2 | 55 | 17.2 | 2-C | 3.2 | 53 | 16.6 | 2-K | 3.1 | 50 | 16.1 |
| 2-3 | 2 | 4.6 | 3-Y | 2.7 | 53 | 19.6 | 3-M | 2.8 | 54 | 19.3 | 3-C | 2.9 | 55 | 19.0 | 3-K | 2.8 | 54 | 19.3 |
| 2-4 | 4 | 2.5 | 1-Y | 3.4 | 2.7 | 0.8 | 1-M | 3.5 | 2.8 | 0.8 | 1-C | 3.5 | 2.8 | 0.8 | 1-K | 3.5 | 2.9 | 0.8 |
| 2-5 | — | — | 2-Y | 3.2 | — | — | 2-M | 3.2 | — | — | 2-C | 3.2 | — | — | 2-K | 3.1 | — | — |

| Experiment No. | Kind of liquid composition | Kind of ink Yellow | Magenta | Cyan | Black | Character quality | Bleeding | Image density | Water resistivity | Note |
|---|---|---|---|---|---|---|---|---|---|---|
| 2-1 | 1 | 1-Y | 1-M | 1-C | 1-K | A | B | A | A | Inv. |
| 2-2 | 2 | 2-Y | 2-M | 2-C | 2-K | A | A | A | B | Inv. |
| 2-3 | 3 | 3-Y | 3-M | 3-C | 3-K | A | A | A | A | Inv. |
| 2-4 | 4 | 1-Y | 1-M | 1-C | 1-K | C | C | C | C | Comp. |
| 2-5 | — | 2-Y | 2-M | 2-C | 2-K | C | C | C | C | Comp. |

Moreover evaluations were performed in the same manner as in Example 1 through 10 except that liquid compositions each containing zirconia sol, titania sol or vanadium oxide sol were used. As the results of the evaluation, it is found that a character and image having a high quality, a high water resistivity and a high density cam be obtained on the plain paper even when zirconia sol, titania sol or vanadium oxide sol was used in place of silica sol.

What is claimed is:

1. An ink set for jet-printing comprising an ink liquid containing a colorant and a substantially colorless liquid composition containing an anionic metal oxide colloid, which are to be mixed with the ink liquid after jetted, wherein a viscosity A cp of said ink liquid, a viscosity B cp of said liquid composition and a viscosity C cp of a mixture of equal amount of said ink liquid and said liquid composition satisfy the following relations;

$|A-B| \leq 5$, $1<A<10$, $1<B<10$, and $C/A>5$.

2. The ink set of claim 1, wherein the viscosity of said liquid composition is within the range of from 2 cp to 8 cp.

3. The ink set of claim 1, wherein said anionic metal oxide colloid is a silica sol.

4. The ink set of claim 1, wherein the content of said metal oxide colloid in said liquid composition is 0.5% to 50% by weight.

5. The ink set of claim 1, wherein the viscosity of said ink liquid is within the range of from 2 cp to 8 cp.

* * * * *